United States Patent
Raghavendra et al.

(10) Patent No.: US 12,034,747 B2
(45) Date of Patent: Jul. 9, 2024

(54) UNSUPERVISED LEARNING TO SIMPLIFY DISTRIBUTED SYSTEMS MANAGEMENT

(71) Applicant: International Business Machines Corporation, Armonk, NY (US)

(72) Inventors: Ramya Raghavendra, New York, NY (US); Mudhakar Srivatsa, White Plains, NY (US); Joshua M. Rosenkranz, Westchester, NY (US); Christopher Streiffer, Metairie, LA (US)

(73) Assignee: International Business Machines Corporation, Armonk, NY (US)

(*) Notice: Subject to any disclaimer, the term of this patent is extended or adjusted under 35 U.S.C. 154(b) by 970 days.

(21) Appl. No.: 16/297,013

(22) Filed: Mar. 8, 2019

(65) Prior Publication Data

US 2020/0287923 A1    Sep. 10, 2020

(51) Int. Cl.
*H04L 9/40* (2022.01)
*G06N 3/088* (2023.01)
*G06N 20/00* (2019.01)

(52) U.S. Cl.
CPC ......... *H04L 63/1425* (2013.01); *G06N 3/088* (2013.01); *G06N 20/00* (2019.01)

(58) Field of Classification Search
CPC ..... H04L 63/1425; H04L 63/14; H04L 67/12; G06N 20/00; G06N 3/088; G06N 3/08; G06F 11/0709; G06F 11/3476
USPC .......................................................... 726/22
See application file for complete search history.

(56) References Cited

U.S. PATENT DOCUMENTS

| | | | |
|---|---|---|---|
| 9,557,879 B1* | 1/2017 | Wang | H04L 41/145 |
| 10,311,356 B2* | 6/2019 | Gu | G06N 3/08 |
| 2006/0106797 A1* | 5/2006 | Srinivasa | G06F 16/2477 |
| 2009/0126023 A1* | 5/2009 | Yun | G06F 21/577 |
| | | | 726/25 |
| 2012/0197856 A1* | 8/2012 | Banka | H04L 67/2885 |
| | | | 707/706 |
| 2014/0317019 A1* | 10/2014 | Papenbrock | G06Q 40/06 |
| | | | 705/36 R |

(Continued)

OTHER PUBLICATIONS

A Survey of Clustering With Deep Learning: From The Perspective of Network Architecture Authors: Erxue Min , Xifeng Guo, Qiang Liu , (Member, IEEE), Gen Zhang , Jianjing Cui, and Jun Long Title Dtae: Aug. 7, 2018 Published by: IEEE Access, vol. 6.*

(Continued)

*Primary Examiner* — William S Powers
*Assistant Examiner* — Gita Faramarzi
(74) *Attorney, Agent, or Firm* — Scully, Scott, Murphy & Presser, P.C.; Peter J. Edwards

(57) ABSTRACT

Data associated with performances of microservices functioning in a distributed computing environment is clustered by executing an unsupervised machine learning algorithm. A representative data is selected from a cluster, selecting performed for a plurality of the clusters. Based on time series data of the representative data associated with the plurality of the clusters, causal extraction is performed. Based on the causal extraction and the plurality of the clusters, a causal graph is constructed. The causal graph is embedded into vector space. Based on the embedded vector space, an artificial neural network model can be trained for managing the distributed computing environment.

20 Claims, 9 Drawing Sheets

(56) References Cited

U.S. PATENT DOCUMENTS

| | | | | |
|---|---|---|---|---|
| 2015/0074023 | A1* | 3/2015 | Gu | G06N 3/08 |
| | | | | 706/20 |
| 2015/0120627 | A1* | 4/2015 | Hunzinger | G06N 7/01 |
| | | | | 706/20 |
| 2016/0234342 | A1* | 8/2016 | Oonk | H04Q 9/00 |
| 2016/0242690 | A1* | 8/2016 | Principe | A61B 5/316 |
| 2017/0230398 | A1* | 8/2017 | Ahmed | G06N 7/005 |
| 2018/0150746 | A1* | 5/2018 | Tu | G06F 18/2132 |
| 2018/0248905 | A1* | 8/2018 | Côté | G06F 17/18 |
| 2019/0228035 | A1* | 7/2019 | Riggs | G06F 16/906 |
| 2019/0294671 | A1* | 9/2019 | Chatterjee | G06F 40/268 |
| 2019/0324831 | A1* | 10/2019 | Gu | G06F 11/0775 |
| 2019/0325312 | A1* | 10/2019 | Matsuo | G06N 3/0454 |
| 2019/0392330 | A1* | 12/2019 | Martineau | G06N 5/04 |
| 2020/0159600 | A1* | 5/2020 | Thakore | G06F 11/3476 |

OTHER PUBLICATIONS

Deep learning for anomaly detection in multivariate time series data Authors: Jan Paul Assendorp Title Dtae: Sep. 1, 2017 Published by: Faculty of Engineering and Computer Science.*

Unsupervised Machine Learning for Networking: Techniques, Applications and Research Challenges Authors: Muhammad Usama, Junaid Qadir Title Dtae: Sep. 19, 2017 Published by MetaLab, School of Computing and Communications, Lancaster University, UK.*

NIST, "NIST Cloud Computing Program", http://csrc.nist.gov/groups/SNS/cloud-computing/index.html, Created Dec. 1, 2016, Updated Oct. 6, 2017, 9 pages.

Usama, M., et al., "Unsupervised Machine Learning for Networking: Techniques, Applications and Research Challenges", arXiv:1709.06599, Sep. 19, 2017, 37 pages.

* cited by examiner

UNSUPERVISED LEARNING TO SIMPLIFY DISTRIBUTED SYSTEMS MANAGEMENT

STATEMENT REGARDING FEDERALLY SPONSORED RESEARCH OR DEVELOPMENT

This invention was made with Government support under W911NF-15-R-0003 awarded by Army Research Office (ARO). The Government has certain rights to this invention.

BACKGROUND

The present application relates generally to computers and computer applications, distributed systems management, machine learning such as unsupervised and/or semi-supervised learning techniques and detecting anomalies in distributed systems.

Distributed systems are monitored to understand their current state and to reason about future performances. Current approaches to distributed system management collect data and usually involve an "expert" to reason about the data. Given the data volume, collecting and analyzing data can place a burden on network, storage and other resources of a computer system. Further, in the presence of complex and high dimensional dependencies of distributed architecture, e.g., microservices-based architecture, being able to accurately predict system anomalies or determine root cause of performance issues can become difficult.

BRIEF SUMMARY

A computer-implemented method and system may be provided. The method, in one aspect, may include receiving data associated with performances of microservices functioning in a distributed computing environment. The method may also include clustering the data into clusters by executing an unsupervised machine learning algorithm. The method may further include selecting a representative data from a cluster, the selecting performed for a plurality of the clusters. The method may also include, based on time series data of the representative data associated with the plurality of the clusters, performing a causal extraction. The method may further include constructing a causal graph based on the causal extraction and the plurality of the clusters. The method may also include embedding the causal graph into vector space. The method may also include, based on the embedded vector space, training an artificial neural network model for managing the distributed computing environment.

A system, in one aspect, may include at least one hardware processor. A memory device may be coupled with at least one hardware processor. The at least one hardware processor may be operable to receive data associated with performances of microservices functioning in a distributed computing environment. The at least one hardware processor may be further operable to cluster the data into clusters by executing an unsupervised machine learning algorithm. The at least one hardware processor may be further operable to select a representative data from a cluster, the selecting performed for a plurality of the clusters. The at least one hardware processor may be further operable to, based on time series data of the representative data associated with the plurality of the clusters, perform a causal extraction. The at least one hardware processor may be further operable to construct a causal graph based on the causal extraction and the plurality of the clusters. The at least one hardware processor may be further operable to embed the causal graph into vector space. The at least one hardware processor may be further operable to, based on the embedded vector space, train an artificial neural network model for managing the distributed computing environment.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A system, method and technique may be provided, which facilitate management of applications, such as those applications which are implemented as a composition of microservices. In some embodiments, system managements in context of composed microservices may be provided. An application can be composed of numerous microservices, e.g., hundreds of microservices. In some embodiments, interconnections between collections or set of microservices used in implementing an application are modeled as graphs. In some embodiments, system management of applications can be implemented as a machine learning based system and/or network management. In some embodiments, an unsupervised machine learning technique can implement shape-based time series clustering and causal inference in generating explainable models in system and/or network management. Machine learning, in some embodiment, learns over time series data generated by a graph, for example, a graph of inter-connected network devices or microservices. The machine learning, in some embodiments, over such a graph may include early fusion of node vector embedding with time series data, and representation of nodes as tensors and observations as channels, which allows for a unified representation of an entire distributed system. Such machine learning approach may preserve both the graph information (e.g., for interconnected microservices) and temporal information.

Microservice architecture structures or implements an application as a collection or set of individual services or components (microservices) that can be independently deployable and are modular. Each individual service or component can provide a fine grained specific service or function. Microservices-based distributed systems include loosely coupled distributed components communicating via well-defined interfaces. Those components can generate metrics, for example, for debugging and monitoring performance of a respective component, and the amount of the generated metrics from all microservices making up an application can be large. Hence, system management of a microservices-based application can become complex.

Figure 1:
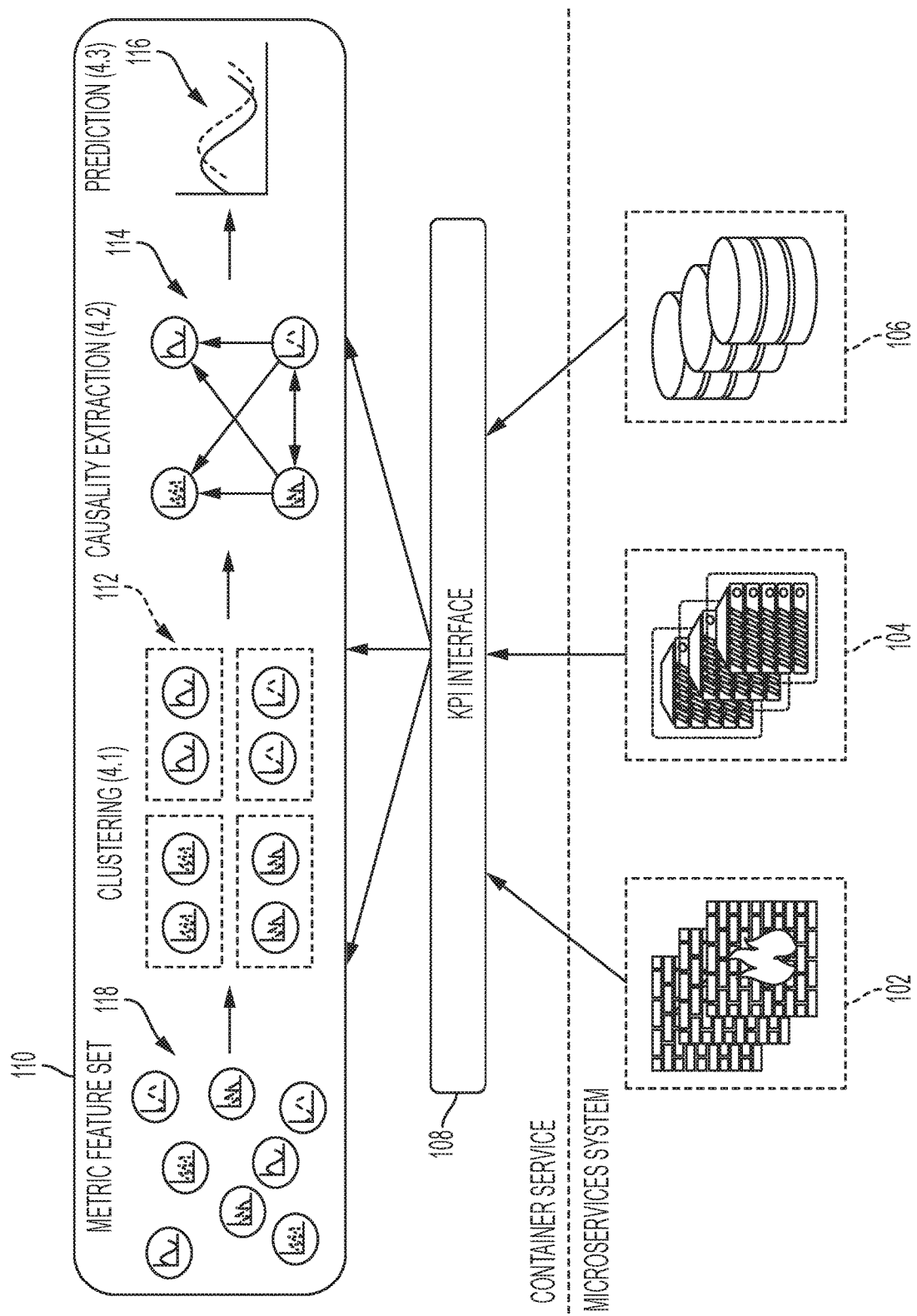
FIG. 1 is a diagram illustrating production environment architecture in one embodiment.

FIG. 1 is a diagram illustrating production environment architecture in one embodiment. An application or application system may be composed of multiple microservices 102, 104, 106, also referred to as microservice nodes. Such an application may be implemented as a distributed system, for example, with the nodes 102, 104, 106 being distributed across a computer network, for example, communicating via a network. Each node or service composing the application may report its metrics or key performance indicator (KPI) to a database or a container service. For instance, a database or a container service may include an interface 108, referred to as a KPI interface, via which the nodes or computer components can communicate with the database or the container service. The database or the container service contains or stores time series data associated with KPIs reported by the microservices 102, 104, 106. A distributed system management components 110 may communicate with the database or the container service via the interface 108, for instance, in retrieving or receiving various metrics reported by the distributed application comprising microservices 102, 104, 106. The distributed system management components 110 may interact with the different components 102, 104, 106 of the distributed system or application through a KPI time series data and run various analyses.

A system and/or method in some embodiments may include the following components or functions: dimensionality reduction 112; causality extraction 114; and forecasting 116. Dimensionality reduction 112 may include determining which logged metrics 118 are relevant for a given application, for example, by understanding application performance, orchestration and debugging, and fingerprinting for anomaly detection and security. Dimensionality reduction 112 reduces the number of logged metrics by grouping them into clusters of similarity, for example, filtering out unrelated metrics and clustering related metrics. In one aspect, clustering may be performed at a microservice level. In another aspect, clustering may be performed a distributed system level. In one embodiment, a cluster represents related metrics within a distributed system. An example of input data to clustering may include, but are not limited to, central processing unit (CPU) log, memory log, and network log, for example, for each of a plurality of microservices in the distributed system. From this input, for example, clustering can output 2 clusters, each cluster representing a type of behavior. For instance, the output 2 clusters may indicate that all metrics across the plurality of microservices show one of two types of behavior. In some embodiments, unsupervised machine learning is employed to cluster related metrics and to produce a representative metric for each cluster or group. Examples of unsupervised machine learning may include, but are not limited to, k-means algorithm and k-shape algorithm.

Causality extraction 114 may include automatically inferring application dependencies and providing actionable insights into system performance based on the inferred application dependencies. Actionable insights may include information associated with a root cause analysis (RCA), anomaly detection and auto-scaling decisions. Causality extraction 114 may include performing a causal extraction on different time series data (or centroids) and aggregating dependent time series, which eliminate duplicate and spurious alerts. In one aspect, time series data can be metrics data of a microservice. There may be multiples of such time series data, for example, each corresponding to a microservice. For instance, time series data may be received or collected from multiple microservices. In one aspect, while dimensionality reduction 112 reduces data to be processed by a subsequent machine learning algorithm, causality extraction 114 can reduce the amount of information presented to an operator. For instance, a centroid may be determined or computed, which is representative of all time series data in a cluster. In this way, for example, the cluster can be collapsed to one representative time series. Causality extraction 114 in some embodiments effectively and continuously may recognize causal relationships between services by observing directly measurable cause-effect factors such as metrics data, tracing and call logs. In some embodiments, granger causality may be performed on cluster centroids. A graph, also referred to as a causal graph or causality graph, can be constructed based on the causal relationships between services determined by causality extraction. Such a graph has nodes and edges, wherein a node represents a metric within a microservice (or another component of a distributed system) and an edge represents a relationship between the nodes that edge connects. For instance, in one embodiment, a node can represent a given metric of a given microservice. In this way, for example, the graph representation can capture a correlation such as between a CPU performance of a microservice and a memory related metric of another microservice.

Forecasting 116 may predict resource utilization of services within the distributed system. Inputs to the forecasting 116 may include metrics 112 and dependencies (which may be complex) 114 in a distributed system 102, 104, 106. Forecasting 116 may facilitates resource planning and anomaly detection in such a distributed system. Dependencies, for example, can be obtained from clustering at 112 and causality extraction at 114, for example, as a causal graph. In some embodiments, forecasting 116 creates models based on past observations to predict, incorporates dependencies information to improve accuracy, and updates the models based on the dependencies. In some embodiments, statistical models such as autoregressive integrated moving average (ARIMA), Holt-winters can be employed to create models based on past observations and to update the models. In some embodiments, deep learning models may be utilized with graph embedding to incorporate dependencies information. Models may be ensembled to improve accuracy, for example, in cases there are sudden changes. For example, a deep neural network such as a long short-term memory (LSTM) can be used for forecasting a metric. An input to such an LSTM can be past observations for that metric, for example, data observations associated with past period of time or time window. The dependency graph can be used to create a graph embedding, which can be used as an additional feature to the LSTM, in addition to historic data for that metric. A graph embedding can provide dependencies between metrics in addition to its own past data.

In some embodiments, a technique is presented that learns on general graphs, for instance, "embed" nodes of a graph into a vector for deep learning tasks. Deep learning models, for example, use tensors, but it may be impractical to represent graphs as tensors. Rather, feature vectors are constructed manually, or techniques such as a deepwalk and node2vec use random walk-based "embedding", e.g., "embed" a node of a graph into a vector for learning. For instance, as an example, in node2vec, given a graph network G=(V, E), where V represents a set of nodes and E represents a set of edges between the nodes, node2vec may embed nodes with similar network neighborhood close in feature space. Node embedding in node2vec may represent each node $n_i$ as a k-dimensional vector $v_1$. Node2vec performs a random walk to learn vector embedding, for example, learns following graph structures, for instance, based on homophily and structural equivalence. Node2vec may generate random walks using a combination of breadth first search (BFS) and depth first search (DFS). Node2vec may use word2vec on generated walks to learn the embeddings. In one aspect, an objective function, which maximizes the log-probability of observing a network neighborhood NS(u) for a node u conditioned on its feature representation, can be optimized.

Figure 2:
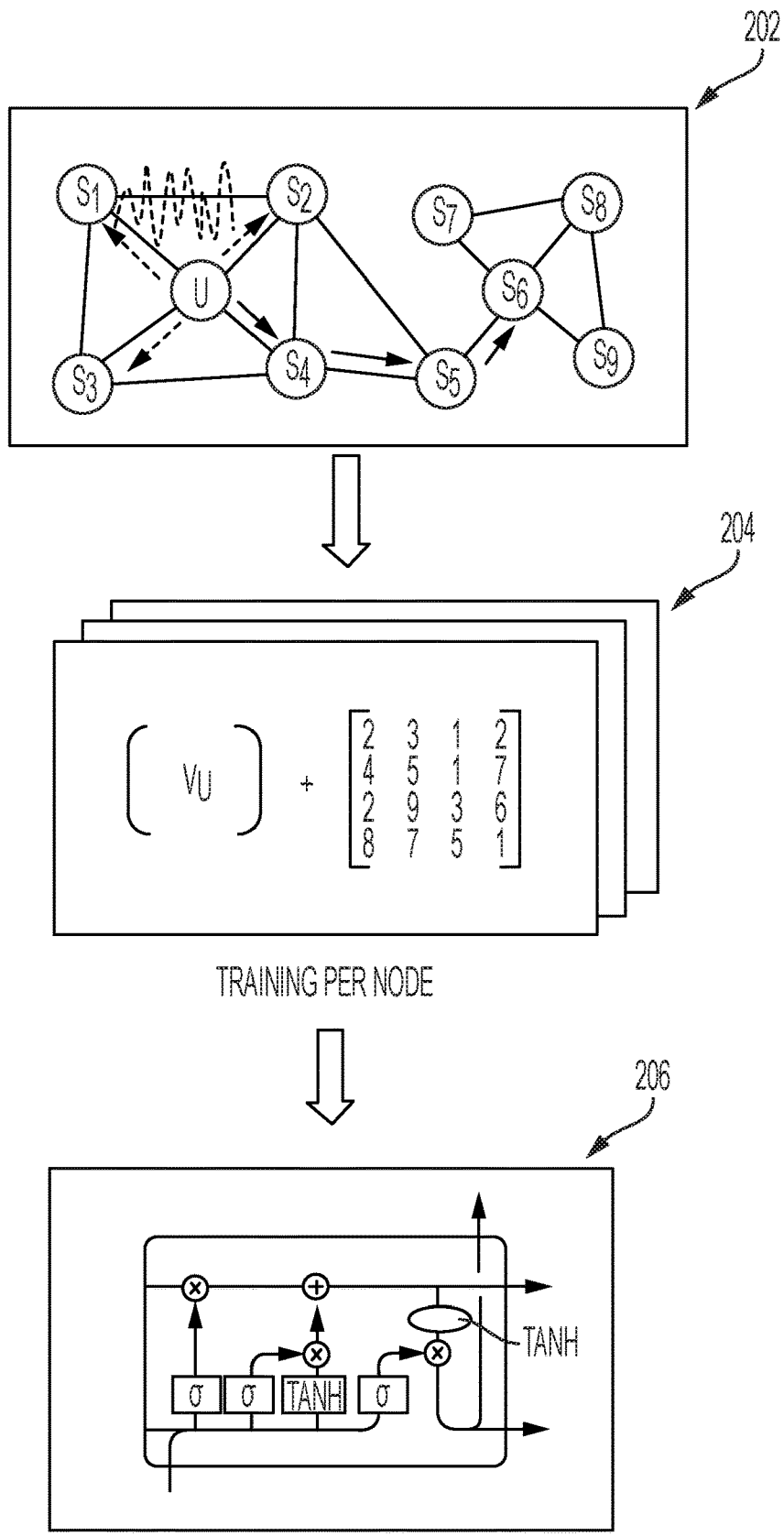
FIG. 2 is a diagram illustrating node embedding concatenated with time series data in one embodiment.

In some embodiments, node embedding may be concatenated with time series data associated with surrounding neighbors of a given node n. In some embodiment, long short-term memory (LSTM) technique may be implemented with node embedding as a feature vector, for instance, to learn long-term dependencies. FIG. 2 is a diagram illustrating node embedding concatenated with time series data in one embodiment. Given a graph including nodes and edges 202, node embedding 204 may be created. In some embodiments, a technique like node2vec may be employed to create node embedding. At 202, nodes S1-S9 represent metrics in the graph. Shown at 202, dashed arrows represent a breadth first search and solid arrows represent depth first search performed in traversing the graph. Node embedding is concatenated with time series data. Node embedding allows a model such as a machine learning model, e.g., LSTM, to learn spatial components of the graph (e.g., distance between the nodes), while the time series data incorporates the temporal components. A spatial component of a graph, for example, describes relationship distance among the nodes of the graph, e.g., causal relationship distances between microservices and/or metrics of microservices. Temporal components refer to data of a metric at different times produced by a microservice. In one embodiment, a graph represents the dependencies between the metrics at the time the graph was constructed, e.g., for that snapshot of data.

A feature vector 204 is created based on the node embedding 202. For instance, V_u refers to the graph embedding generated, for example, using a technique such as node2vec. The matrix shown at 204 includes raw time series data of the metrics. A machine learning model such as an LSTM 206 can be trained based on the feature vector 204.

Figure 3:
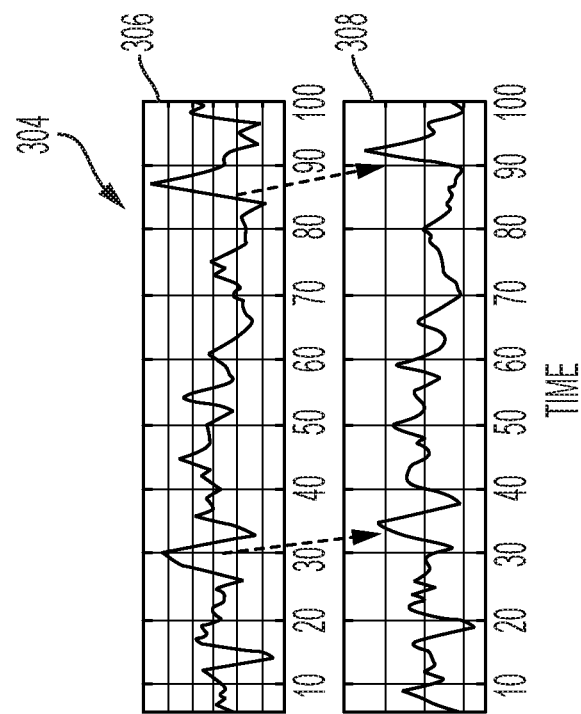
FIG. 3 illustrates an example causal graph and analysis for co-learning embedding in one embodiment.
Figure 3:
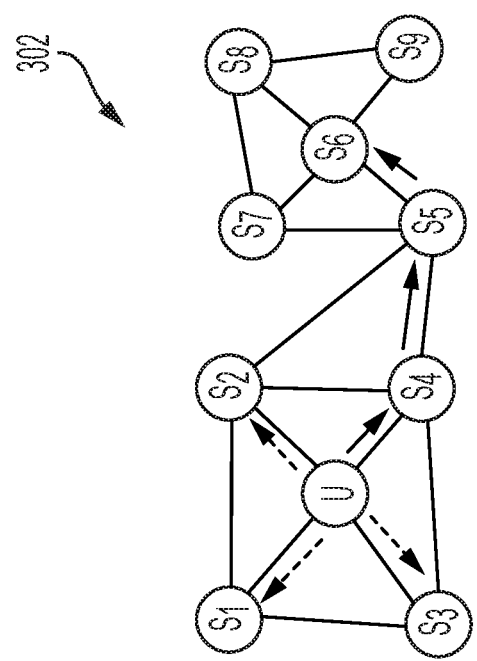

FIG. 3 illustrates an example causal graph and analysis for co-learning embedding in one embodiment. A pre-training session may include building a causal graph 302 based on analyzing time series metrics data 304 associated with microservices. For instance, time series data 306 may be associated with a microservice represented as node in the causal graph 302, and time series data 308 may be associated with another microservice represented another node in the causal graph 302. The relationships may be established between the nodes based on the associated time series data. For instance, time series data 308 follows the pattern of time series data 306, offset by an interval of time, and thus, it can be inferred that there is a cause-effect (causal) relationship between the sources (e.g., nodes representing metrics within a microservice) those time series data 306, 308. In some embodiments, embeddings are co-learned during a regression training. For instance, in some embodiments, instead of creating an embedding before-hand using node2vec, a method and/or system can co-learn the feature-vector embedding during a training process itself. For example, a method and/or system can specify an LSTM to learn the embedding. In this approach, each embedding can be represented as a unique tensor of k-dimensionality with a uniform random initialization. During the training phase, the tensors can be updated using a stochastic gradient descent (SGD) technique.

Figure 4:
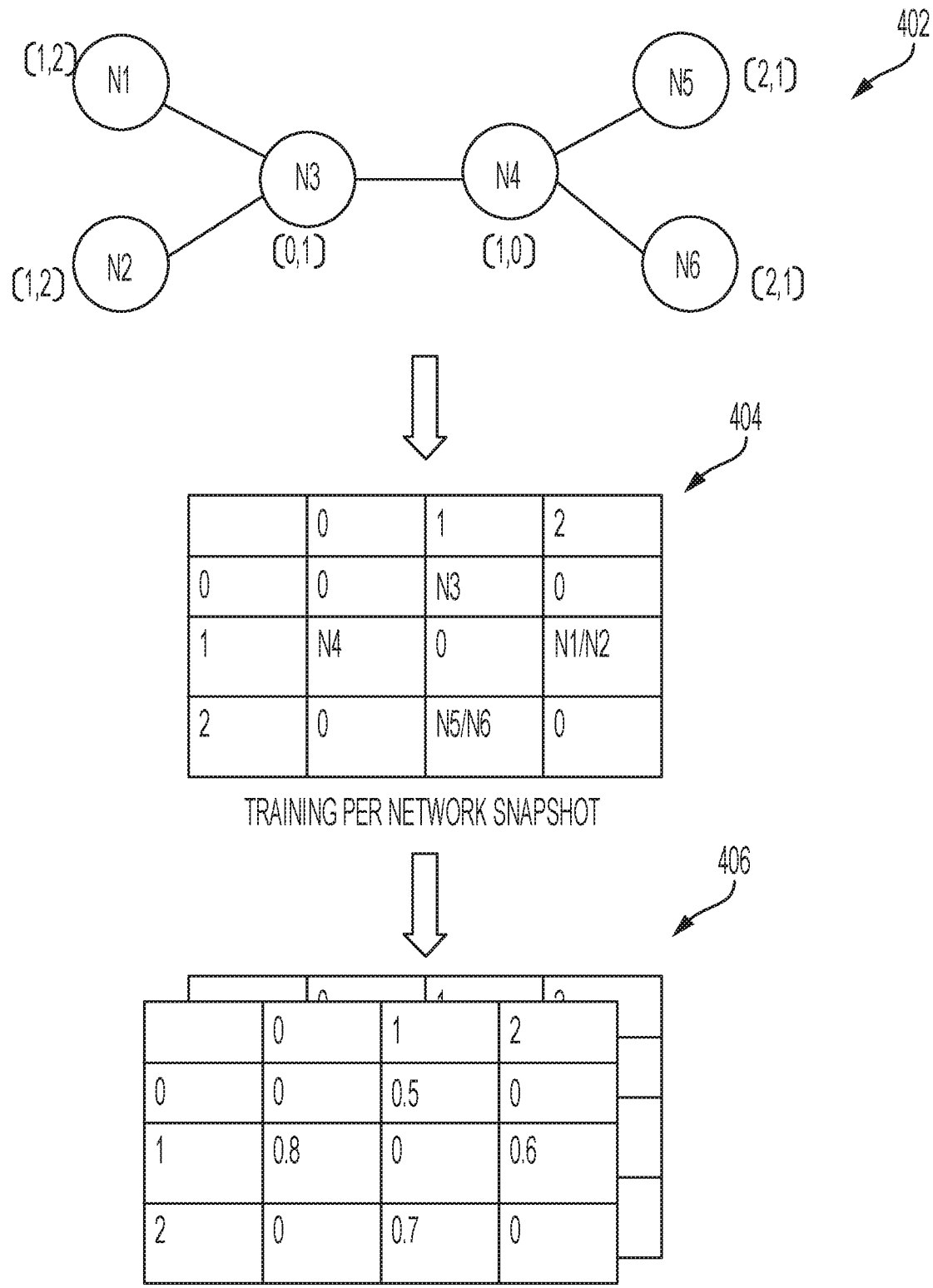
FIG. 4 is a diagram illustrating node embedding as a tensor in one embodiment.

FIG. 4 is a diagram illustrating node embedding as a tensor in one embodiment. In one embodiment, pre-trained embeddings can be used to construct a tensor. The nodes at 402 represent a metric of a microservice. In the example embedding shown in FIG. 4, the nodes N3 and N4 represent reference nodes, and the other nodes are assigned a 2 point co-ordinate system based on their distance from N3 and N4. The 2-dimensional array shown at 404 represents graph embedding of nodes. The 2-dimensional array shown at 406 represents graph embedding represented with metric values the nodes represent.

In this diagram, spatial relationships between nodes can be preserved. In one aspect, a resulting tensor can be sparse, but have less probability of collision. For instance, nodes with structural equivalence may result in collisions; more landmarks may result in fewer collisions. "Landmarks" refer to a subset of vertexes (nodes), which can be selected for learning the embedding between other vertices (nodes) and the landmarks.

An embedding for a given node is represented as a position in a k-dimensional array $(x_0\ x_1\ \ldots\ x_k)$. In one aspect, the value of k depends on the number of reference nodes that are selected for a "co-ordinate system" for assigning distances. In one aspect, the value of k depends on the size of the graph and nodes considered to be important in the graph, referred to as "anchor nodes". For example, in a computer network, k can be the number of routers. Each dimension $x_i$ is computed as the total number of hops away from a pre-selected node $n_1$. In landmark based embedding, in one aspect, collisions can be removed or merged.

Once a causal graph is extracted (e.g., shown in FIG. 1 at 114), the causal graph is embedded into a vector space. Such vector space can be input to a classification and/or regression task (e.g., machine learning). In some embodiments, a tensor is created based on spatial embeddings resulting from the graph embedding. This tensor can be used as input to forecasting (e.g., shown in FIG. 1 at 116).

A system and method in some embodiments may include reducing a metrics space associated with components of a distributed system, for instance, using one or more dimensionality reduction techniques. For instance, data or data log may be received, which include a plurality of metrics associated with a set of system components and/or software applications. The data or metrics can be clustered based on similarity of what the metrics measure, and a representative metric of each cluster can be selected, for instance, thus reducing the metrics space.

The system and method in some embodiments may also include inferring causal relationships, based on which a causal graph can be created. For instance, a causal extraction on time series data for each cluster may be performed. For example, a technique such as granger causality may be performed on cluster centroids. For instance, a causal graph may be constructed based on the clusters and the causal extractions. A node of a causal graph represents a metric of a microservice and an edge of the causal graph represents a relationship between the nodes the edge connects, for example, cause and effect relationship.

The system and method in some embodiments may further include creating graph embeddings using the causal graph and metrics, e.g., clustered data or centroid which represent the clustered data. The graph can be embedded into a vector space. The vector space can be used to train a deep learning model. In another aspect, the vector space can be used to improve accuracy of a trained deep learning model, for example, to improve the model in predicting or forecasting. Based on a result of forecasting, a change can be made to a system, for example, to improve the system. For example, a forecasting may include predicting resource usage of the system components and/or software applications, and an example of a change can include changing the amount of resources such as the system components and/or software applications based on the forecasted resource usage.

The system and method in some embodiments may also include performing anomaly detection, for example, based on the causal graph. For instance, a change in causal graph over time and/or a deviation from a forecasted value can signal anomaly or error in a system. The system and method in some embodiments may further include performing a root cause analysis. For example, a component that changed in the causal graph and the component's causal components can be examined. As another example, a component that deviated from its predicted values and the component's downstream in the causal graph can be examined. In some embodiment, based on the anomaly detected and/or the root cause detected, a system and method may instantiate a change in the system automatically or autonomously. For example, resources may be autoscaled (automatically or autonomously scaled). As another example, a service or node that is determined to be behaving in an anomalous manner can be stopped.

In one aspect, clustering of metrics may reduce the amount of data processing in a distributed system, thereby, freeing up resources such as processing power and storage or memory space, and also possibly reducing network congestion. For instance, in some embodiment, data can be received or collected from centroids (e.g., representatives) of clusters only. Messages can be sent to other nodes to not collect data and/or send data. Causality extraction or causal graph can further reduce data collection and facilitate provisioning. Forecasting and anomaly detection can facilitate provisioning components and reducing anomalous devices.

Figure 5:
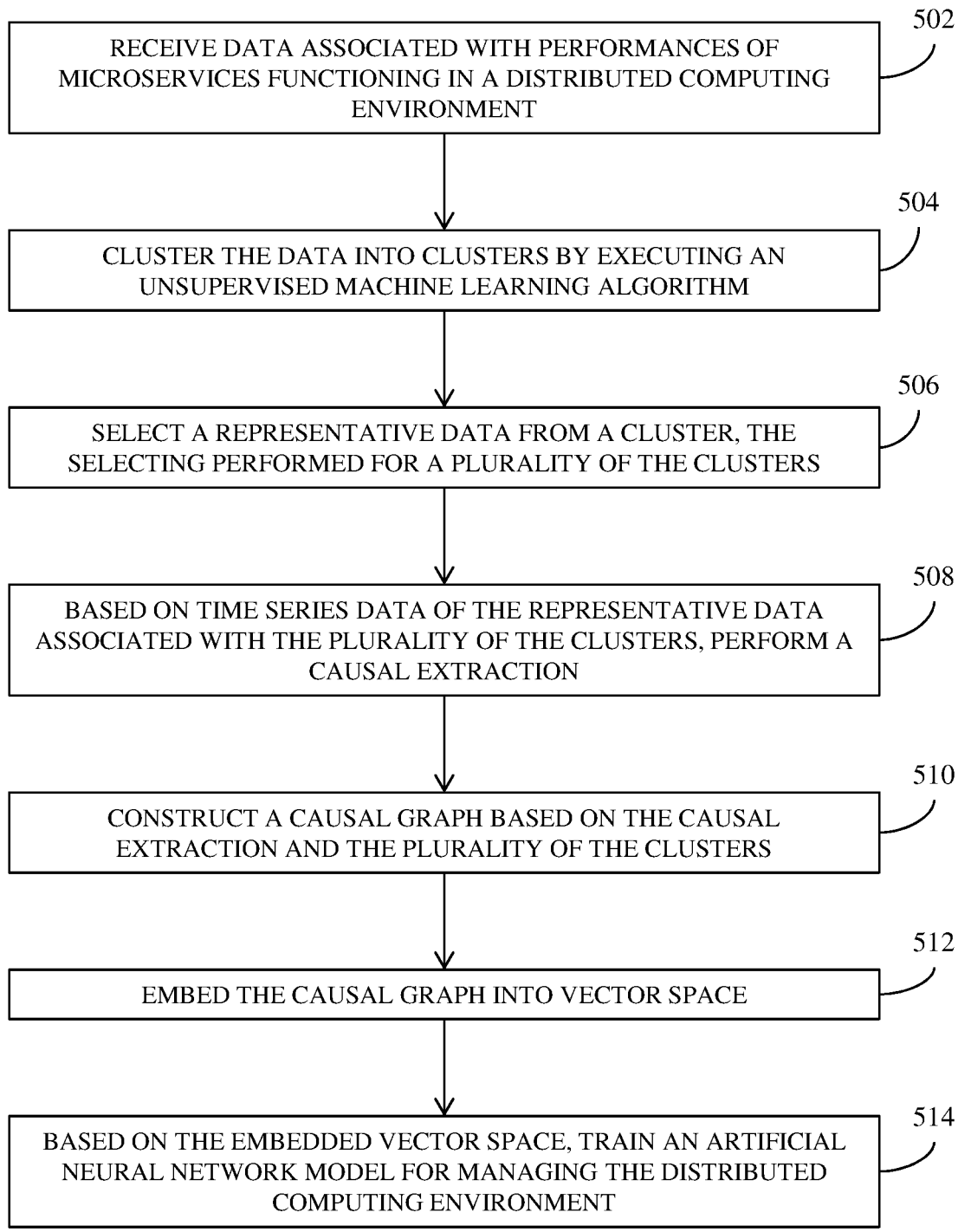
FIG. 5 is a diagram illustrating a method in one embodiment.

FIG. 5 is a diagram illustrating a method in one embodiment. The method facilitates managing a distributed system comprising multiple components such as a network of microservices functioning in a distributed environment. At 502, data may be received, which are representative of metrics or measurements associated with performance or functioning of microservices in a distributed computing system. In some embodiments, an application programming interface (API) may allow receiving or retrieving of such data, for example, from a database or databases storing and managing application performance data. In some embodiments, microservices may via an API, send their data, for example, performance measurement data, to such databases for storage. For instance, a microservice may log its performance measurements and store in a database.

At 504, the data is clustered into a number of clusters or groups. A clustering algorithm such as unsupervised machine learning algorithms can be used to perform clustering. Examples of such algorithms may include, but are not limited to, K-means and K-shape algorithms.

At 506, a representative data, also referred to as a centroid, may be selected from a cluster. The selecting may be performed for a plurality of clusters, for example, each of the clusters. A centroid represents a metric of a microservice.

The received data, for instance, can include time series data. For instance, the representative data includes time series data of a selected metric. At 508, based on the time series data, a causal extraction is performed among the clusters. In one aspect, a cluster may contain a representative time series data of a representative microservice.

At 510, a causal graph is constructed based on the clusters and the causal extraction. For example, a node of the graph represents a metric of a microservice which produced a time series data and an edge of the graph represents causal relationship between the nodes the edge connects, the causal relationship determined by the causal extraction. The causal extraction, for instance, extracted causal relationship between the time series data associated with a microservice and the time series data associated with another microservice.

At 512, the graph is embedded into vector space, e.g., as feature vector. For instance, techniques such as node2vec can be used to perform node embedding. In one aspect, the time series data is embedded into the vector space. A tensor can be created based on spatial relationships of nodes in the causal graph. In one aspect, nodes of the graph can be represented in a tensor and observations (e.g., the time series data) can be represented as channels. In one embodiment, one tensor represents one snapshot of the graph. When the graph evolves, a new tensor may be created to capture the new graph.

At 514, the feature vector is input to a neural network model, for example, a deep learning neural network model, for instance, to train the deep learning neural network model. Such a model may be implemented to manage a distributed system, which may include the microservices, applications or other components. For example, based on the feature vector, the deep learning model is trained to predict anomaly in the distributed computing environment. In another aspect, a neural network model, for example, a deep learning neural network model is trained to predict resource usage of the microservices in the distributed computing environment.

Figure 6:
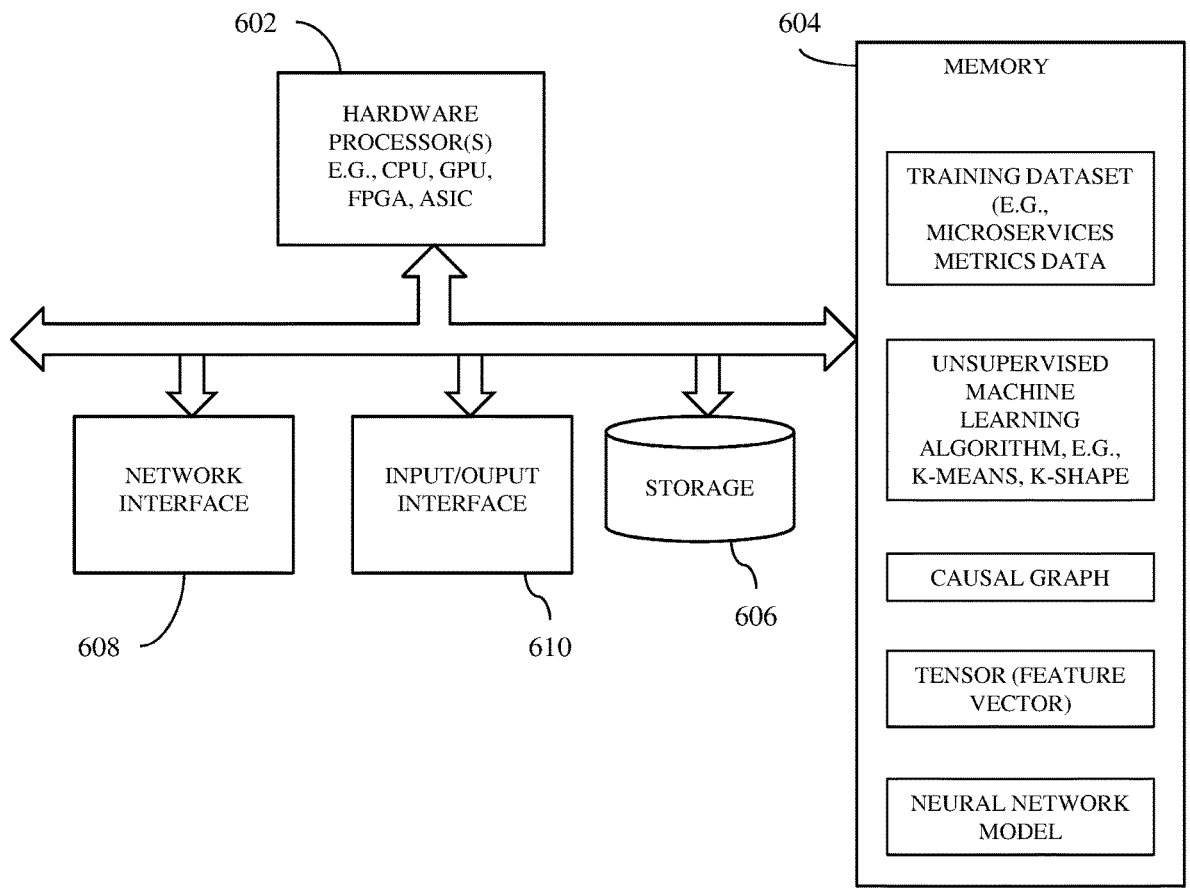
FIG. 6 is a diagram showing components of a system in one embodiment, which uses machine learning algorithms to simplify distributed systems management.

FIG. 6 is a diagram showing components of a system in one embodiment, which uses machine learning algorithms to simplify distributed systems management. One or more hardware processors 602 such as a central processing unit (CPU), a graphic process unit (GPU), and/or a Field Programmable Gate Array (FPGA), an application specific integrated circuit (ASIC), and/or another processor, may be coupled with a memory device 604, and generate a prediction model and recommend communication opportunities. The memory device 604 may include random access memory (RAM), read-only memory (ROM) or another memory device, and may store data and/or processor instructions for implementing various functionalities associated with the methods and/or systems described herein. One or more processors 602 may execute computer instructions stored or loaded in the memory device 604 or received from another computer device or medium. The memory device 604 may, for example, store instructions and/or data for functioning of one or more hardware processors 602, and may include an operating system and other program of instructions and/or data. One or more hardware processors 602 may receive input, for example, metrics data associated with microservices or components of a distributed computing system or environment. In one aspect, such metrics data may be stored on a storage device 606 or received via a network interface 608 from a remote device, and may be temporarily loaded into the memory device 604 for allowing at least one hardware processor 602 to perform its functions. At least one hardware processor 602 may cluster the data into clusters by executing an unsupervised machine learning algorithm. The clusters may be stored on the device 604, for example, temporarily, and/or on a storage device 606. At least one hardware processor 602 may select a representative data from a cluster, for example, for each of the clusters. Based on time series data of the representative data associated with each of the plurality of the clusters, at least one hardware processor 602 may perform a causal extraction. At least one hardware processor 602 may also construct a causal graph based on the causal extraction and the plurality of the clusters. The causal graph may be stored on the device 604, for example, temporarily, and/or on a storage device 606. At least one hardware processor 602 may embed the causal graph into vector space, for example, create a feature vector based on the causal graph. The feature vector may be stored on the device 604, for example, temporarily, and/or on a storage device 606. Based on the embedded vector space, at least on hardware processor 602 may train an artificial neural network model for managing the distributed computing environment. The trained artificial neural network model may be stored on the device 604, for example, temporarily, and/or on a storage device 606. One or more hardware processors 602 may be coupled with interface devices such as a network interface 608 for communicating with remote systems, for example, via a network, and an input/output interface 610 for communicating with input and/or output devices such as a keyboard, mouse, display, and/or others.

A method and system in some embodiments use unsupervised or semi-supervised learning techniques to monitor, forecast and detect problems in microservices-based distributed systems. In one aspect, the unsupervised learning can be based on a unified framework for reducing complexity in network monitoring. In one aspect, a multi-stage pipeline may be used for unsupervised learning framework where each component can act individually or cohesively for performing various management tasks to provide a unified framework for managing complexity of large networks. In one aspect, metrics space can be reduced using a dimensionality reduction technique, causal relationships can be inferred to create a causal graph. Using causal graph and metrics, graph embeddings can be created. Graph embeddings can be used to improve accuracy of forecasting for performing problem detection. Root cause analysis can be performed by observing a change in causal graph and deviation from forecasted values.

Performance prediction can facilitate managing various tasks in distributed computing environment, for example, including resource allocation and traffic engineering. Dimensionality reduction in the present disclosure can assist in several management tasks—clustering services that exhibit similar temporal behavior for system interpretability, or detecting anomalies when a service's temporal finger print changes. Causality extraction can provide insights into service relationships which can assist in localizing faults and leveraging dependencies to improve predictions.

Figure 7:
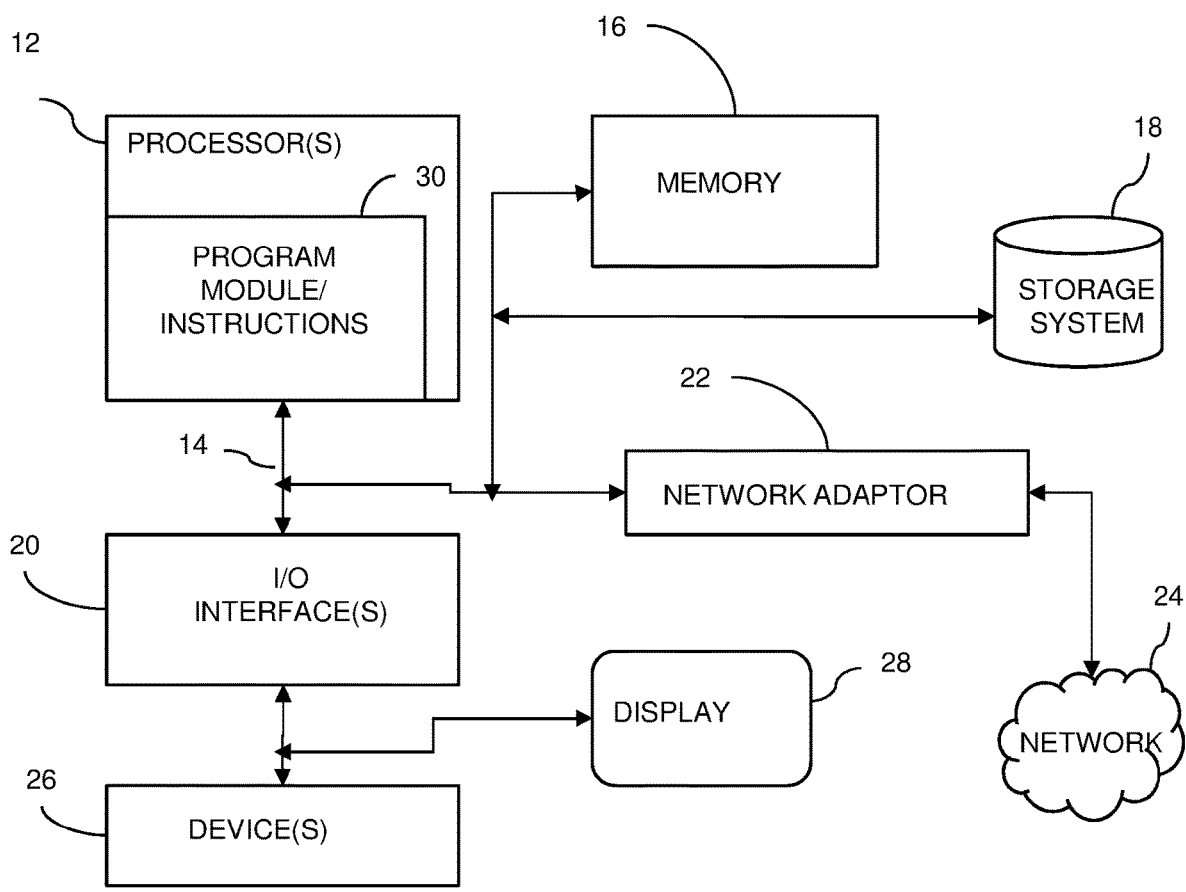
FIG. 7 illustrates a schematic of an example computer or processing system that may implement a system according to one embodiment.

FIG. 7 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device or system 18, or network 24 or combinations thereof Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
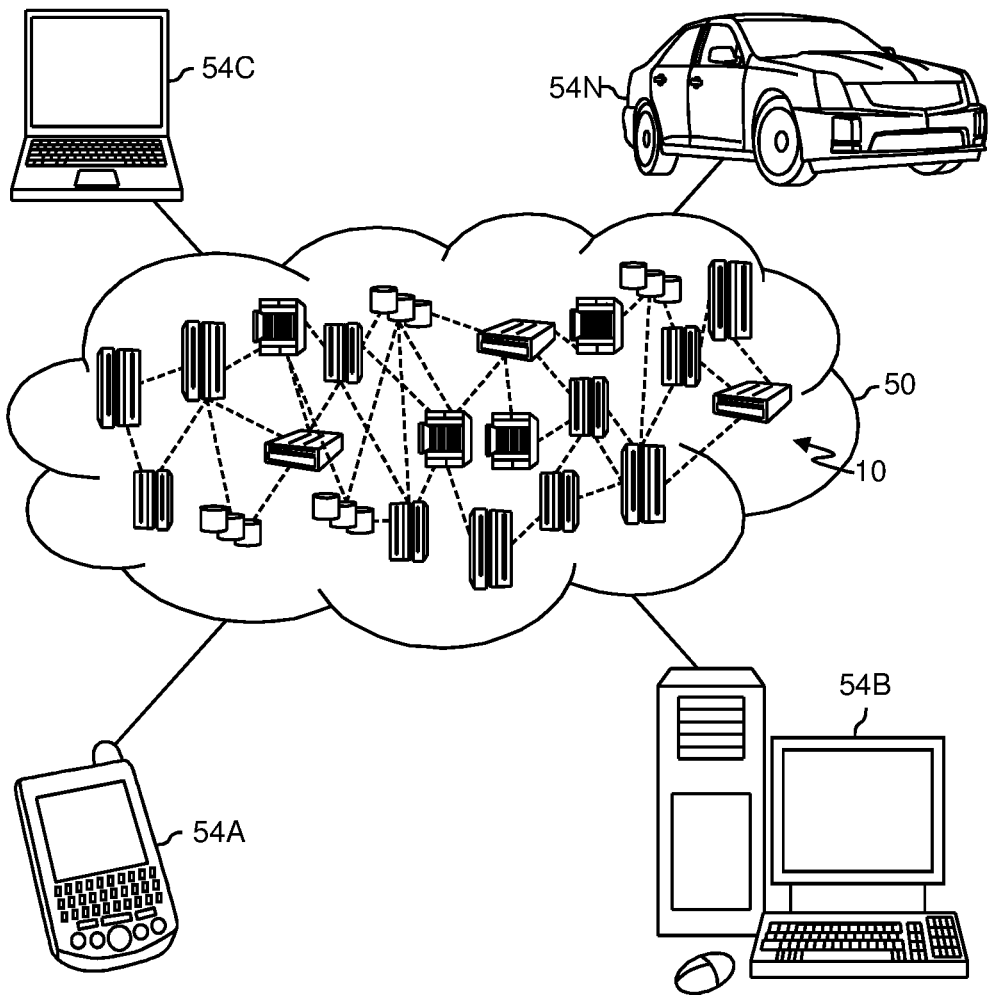
FIG. 8 illustrates a cloud computing environment in one embodiment.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
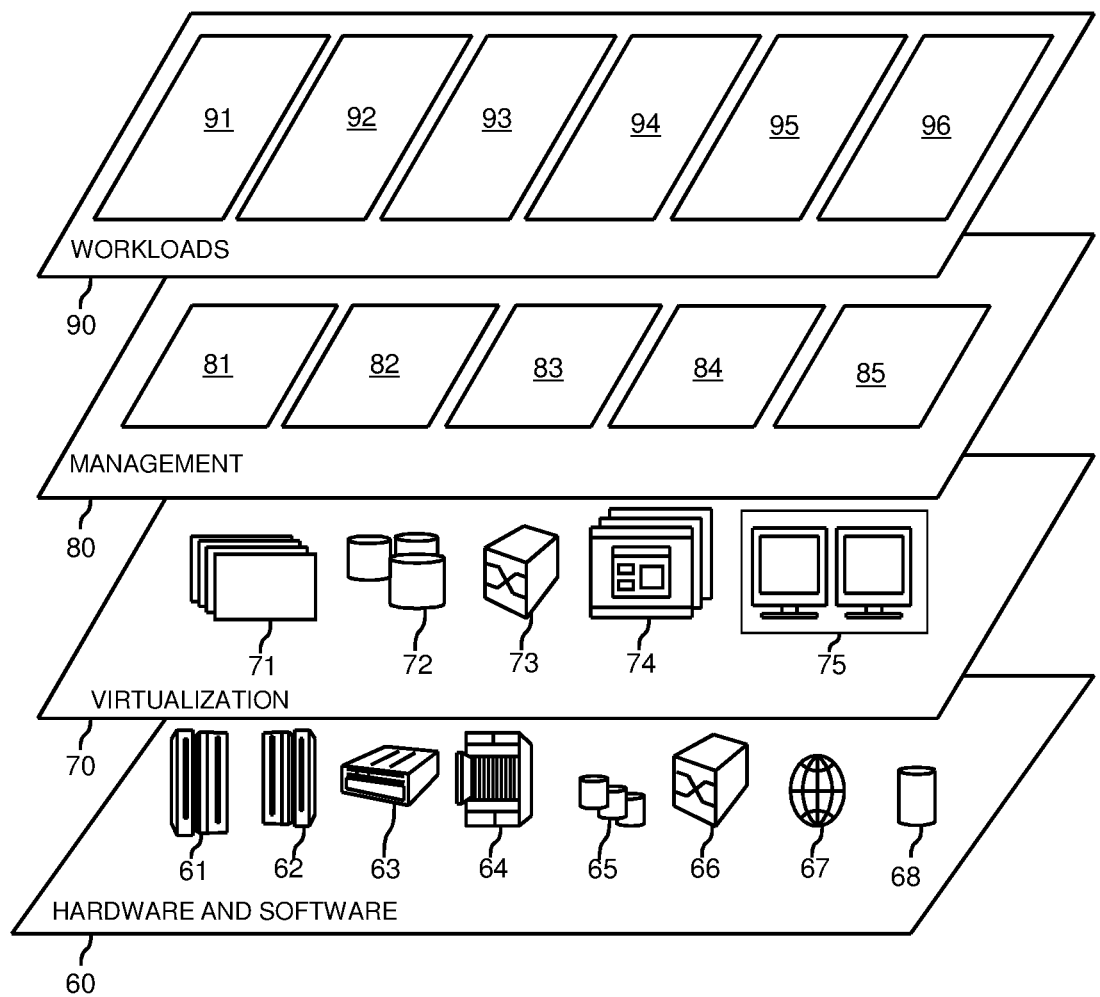
FIG. 9 illustrates a set of functional abstraction layers provided by cloud computing environment in one embodiment of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and machine learning for distributed system management processing 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
receiving data associated with performances of microservices functioning in a distributed computing environment;
clustering the data into clusters of types of metrics by executing an unsupervised machine learning algorithm;
selecting a representative data from a cluster, the representative data being representative of time series data in the cluster, the selecting performed for a plurality of the clusters wherein the representative data is selected for each of the plurality of the clusters;
based on time series data of the representative data associated with the plurality of the clusters, performing a causal extraction, the causal extraction inferring dependencies among a plurality of different time series data wherein a time series data in the plurality of different time series data represents metrics of a microservice, the causal extraction recognizing cause-effect relationships between different metrics among the microservices;
constructing a causal graph based on at least the cause-effect relationships between the different metrics among microservices, the causal graph having nodes and edges connecting at least some of the nodes, wherein each node of the causal graph represents a microservice's metric type;
embedding the causal graph into vector space, wherein the nodes of the causal graph embedded into the vector space are concatenated with time series data associated with respective nodes, wherein the embedding the causal graph into vector space incorporates spatial components of the causal graph and temporal components of the microservices' metrics, wherein an embedding for a given node of the nodes is represented as a position in a k-dimensional array, wherein k depends on a number of reference nodes selected in the causal graph as co-ordinates for assigning distances, wherein a dimension of the k-dimensional array is computed as a total number of hops away from a pre-selected node, the pre-selected node being one of the reference nodes; and
based on the embedded vector space used as a feature vector that represents a fusion of graph embedding with time series data, training an artificial neural network model for managing the distributed computing environment, wherein the representative data selected for each of the plurality of the clusters is used for managing the distributed computing environment.

2. The computer-implemented method of claim 1, wherein the artificial neural network model is trained to predict an anomaly in the distributed computing environment.

3. The computer-implemented method of claim 1, wherein the artificial neural network model is trained to predict resource usage of the microservices.

4. The computer-implemented method of claim 1, wherein the representative data comprises a centroid of the cluster, and the causal extraction comprises granger causality.

5. The computer-implemented method of claim 1, wherein the embedding the causal graph embeds the time series data into the vector space.

6. The computer-implemented method of claim 1, wherein the causal graph is represented as a tensor and the time series data associated with nodes of the causal graph are represented as channels.

7. The computer-implemented method of claim 1, wherein the embedding the causal graph into vector space comprises creating a tensor based on spatial relationships of nodes in the causal graph.

8. The computer-implemented method of claim 1, further comprising: based on executing the trained artificial neural network model, automatically stopping a microservice determined to be anomalous.

9. The computer-implemented method of claim 1, further comprising: based on executing the trained artificial neural network model, automatically provisioning additional resource to the distributed computing environment.

10. The computer-implemented method of claim 1, further comprising: detecting a change in the causal graph built over time, and based on the change, determining whether a microservice is anomalous.

11. A system, comprising:
at least one hardware processor;
a memory device coupled with at least one hardware processor;
the at least one hardware processor operable to:
receive data associated with performances of microservices functioning in a distributed computing environment;
cluster the data into clusters of types of metrics by executing an unsupervised machine learning algorithm;
select a representative data from a cluster, the representative data being representative of time series data in the cluster, the selecting performed for a plurality of the clusters wherein the representative data is selected for each of the plurality of the clusters;
based on time series data of the representative data associated with the plurality of the clusters, perform a causal extraction, the causal extraction inferring dependencies among a plurality of different time series data wherein a time series data in the plurality of different time series data represents metrics of a microservice, the causal extraction recognizing cause-effect relationships between different metrics among the microservices;
construct a causal graph based on at least the cause-effect relationships between the different metrics among microservices, each node of the causal graph representing a microservice's metric type;
embed the causal graph into vector space, wherein the nodes of the causal graph embedded into the vector space are concatenated with time series data associated with respective nodes, wherein the causal graph embed into the vector space incorporates spatial components of the causal graph and temporal components of the microservices' metrics, wherein an embedding for a given node of the nodes is represented as a position in a k-dimensional array, wherein k depends on a number of reference nodes selected in the causal graph as co-ordinates for assigning distances, wherein a dimension of the k-dimensional array is computed as a total number of hops away from a pre-selected node, the pre-selected node being one of the reference nodes; and
based on the embedded vector space used as a feature vector that represents a fusion of graph embedding with time series data, train an artificial neural network model for managing the distributed computing environment, wherein the representative data selected for each of the plurality of the clusters is used for managing the distributed computing environment.

12. The system of claim 11, wherein the artificial neural network model is trained to predict an anomaly in the distributed computing environment.

13. The system of claim 11, wherein the artificial neural network model is trained to predict resource usage of the microservices.

14. The system of claim 11, wherein the representative data comprises a centroid of the cluster, and the causal extraction comprises granger causality.

15. The system of claim 11, wherein the time series data is embedded into the vector space.

16. The system of claim 11, wherein the causal graph is represented as a tensor and the time series data associated with nodes of the causal graph are represented as channels.

17. The system of claim 11, wherein based on executing the trained artificial neural network model, a microservice determined to be anomalous is automatically stopped.

18. A computer program product comprising a computer readable storage medium having program instructions embodied therewith, the program instructions executable by a device to cause the device to:
receive data associated with performances of microservices functioning in a distributed computing environment;
cluster the data into clusters of types of metrics by executing an unsupervised machine learning algorithm;
select a representative data from a cluster, the representative data being representative of time series data in the cluster, the selecting performed for a plurality of the clusters wherein the representative data is selected for each of the plurality of the clusters;
based on time series data of the representative data associated with the plurality of the clusters, perform a causal extraction, the causal extraction inferring dependencies among a plurality of different time series data wherein a time series data in the plurality of different time series data represents metrics of a microservice, the causal extraction recognizing cause-effect relationships between different metrics among the microservices;
construct a causal graph based on at least the cause-effect relationships between the different metrics among microservices, each node of the causal graph representing a microservice's metric type;
embed the causal graph into vector space, wherein the nodes of the causal graph embedded into the vector space are concatenated with time series data associated with respective nodes, wherein the causal graph embed into the vector space incorporates spatial components of the causal graph and temporal components of the microservices' metrics, wherein an embedding for a given node of the nodes is represented as a position in a k-dimensional array, wherein k depends on a number of reference nodes selected in the causal graph as co-ordinates for assigning distances, wherein a dimension of the k-dimensional array is computed as a total number of hops away from a pre-selected node, the pre-selected node being one of the reference nodes; and
based on the embedded vector space used as a feature vector that represents a fusion of graph embedding with time series data, train an artificial neural network model for managing the distributed computing environment, wherein the representative data selected for each of the plurality of the clusters is used for managing the distributed computing environment.

19. The computer program product of claim 18, wherein the artificial neural network model is trained to predict an anomaly in the distributed computing environment.

20. The computer program product of claim 19, wherein based on executing the trained artificial neural network model, a microservice determined to be anomalous is automatically stopped.

\* \* \* \* \*